United States Patent [19]
Havlovitz

[11] Patent Number: 5,692,761
[45] Date of Patent: Dec. 2, 1997

[54] UTILITY CART

[75] Inventor: Paul M. Havlovitz, Escondido, Calif.

[73] Assignee: Republic Tool & Mfg. Corp., Carlsbad, Calif.

[21] Appl. No.: 683,773

[22] Filed: Jul. 15, 1996

[51] Int. Cl.⁶ .................................... B62B 1/18
[52] U.S. Cl. ................ 280/33.994; 280/33.998; 280/655.1; 280/659; 280/47.26
[58] Field of Search ............... 280/659, 33.998, 280/655.1, 33.994, 653, 47.31, 47.33, 47.371, 47.26, 47.34; 206/509, 505, 504, 503

[56] References Cited

U.S. PATENT DOCUMENTS

| | | | |
|---|---|---|---|
| 2,446,137 | 7/1948 | Krueger | 280/36 |
| 2,818,988 | 1/1958 | Dunkin . | |
| 2,939,717 | 6/1960 | Parker et al. . | |
| 2,958,537 | 11/1960 | Young | 280/33.99 |
| 3,314,688 | 4/1967 | Guegold | 280/47.37 |
| 4,071,920 | 2/1978 | Block | 15/49 |
| 4,511,154 | 4/1985 | Daloisio . | |
| 4,611,962 | 9/1986 | Braly et al. | 410/57 |
| 4,630,837 | 12/1986 | Kazmalk . | |
| 5,149,115 | 9/1992 | Sampedro . | |
| 5,299,816 | 4/1994 | Von Braucke et al. . | |
| 5,318,315 | 6/1994 | White et al. . | |
| 5,340,136 | 8/1994 | MacNeil et al. . | |
| 5,350,030 | 9/1994 | Mawhinney et al. . | |
| 5,415,421 | 5/1995 | Godwin | 280/47.31 |
| 5,445,397 | 8/1995 | Evans | 280/47.18 |

FOREIGN PATENT DOCUMENTS

| | | | |
|---|---|---|---|
| 3627-040-A | 2/1988 | Germany | 280/33.998 |
| 5-139314 | 6/1993 | Japan | 280/33.998 |
| 2 237 539 | 5/1991 | United Kingdom | 280/659 |

*Primary Examiner*—Brian L. Johnson
*Assistant Examiner*—Bridget Avery
*Attorney, Agent, or Firm*—Harry Williams

[57] ABSTRACT

A large bucket-like utility cart having two pairs of wheels for allowing the cart to be tilted in both forward and backward directions on respective pairs of wheels by means of a collapsible loop handle with an angled crossbar design. A number of such utility carts can be alternately stacked or nested within one another with either the handle extended for use or collapsed or folded to its inoperative position, thus creating a high-density multiple-product module suitable for shipping, storage or display.

11 Claims, 6 Drawing Sheets

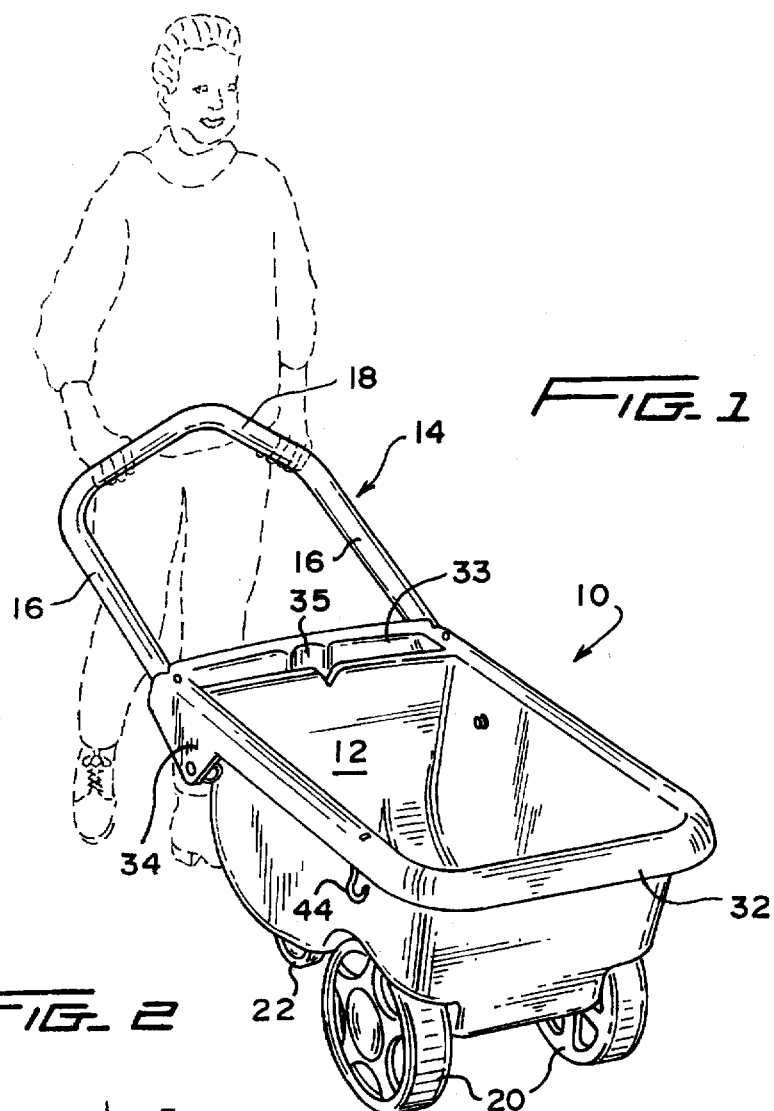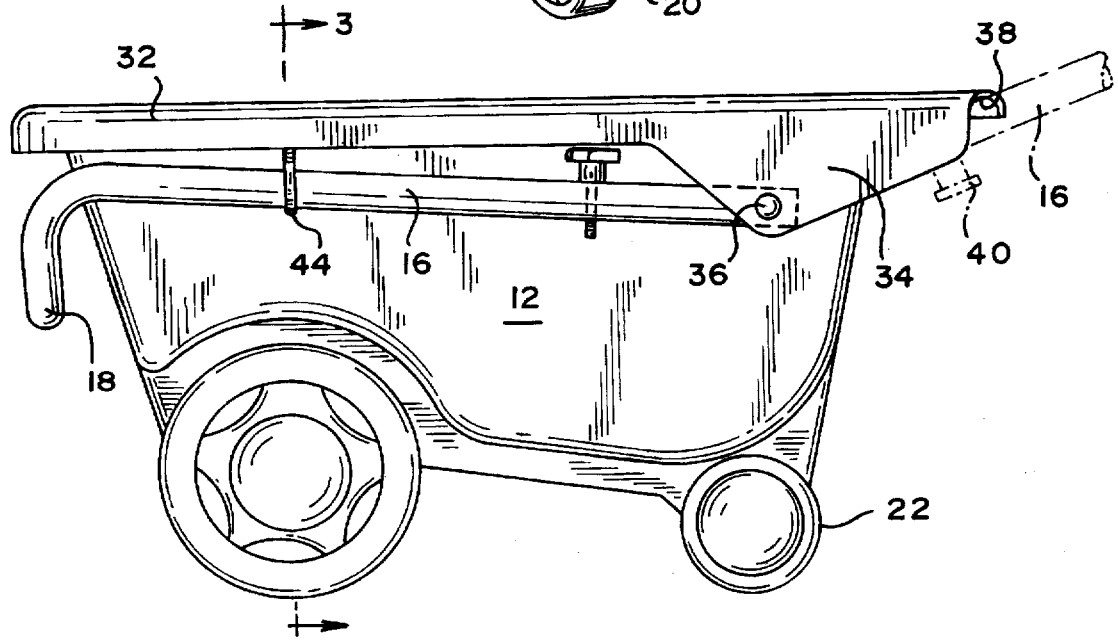

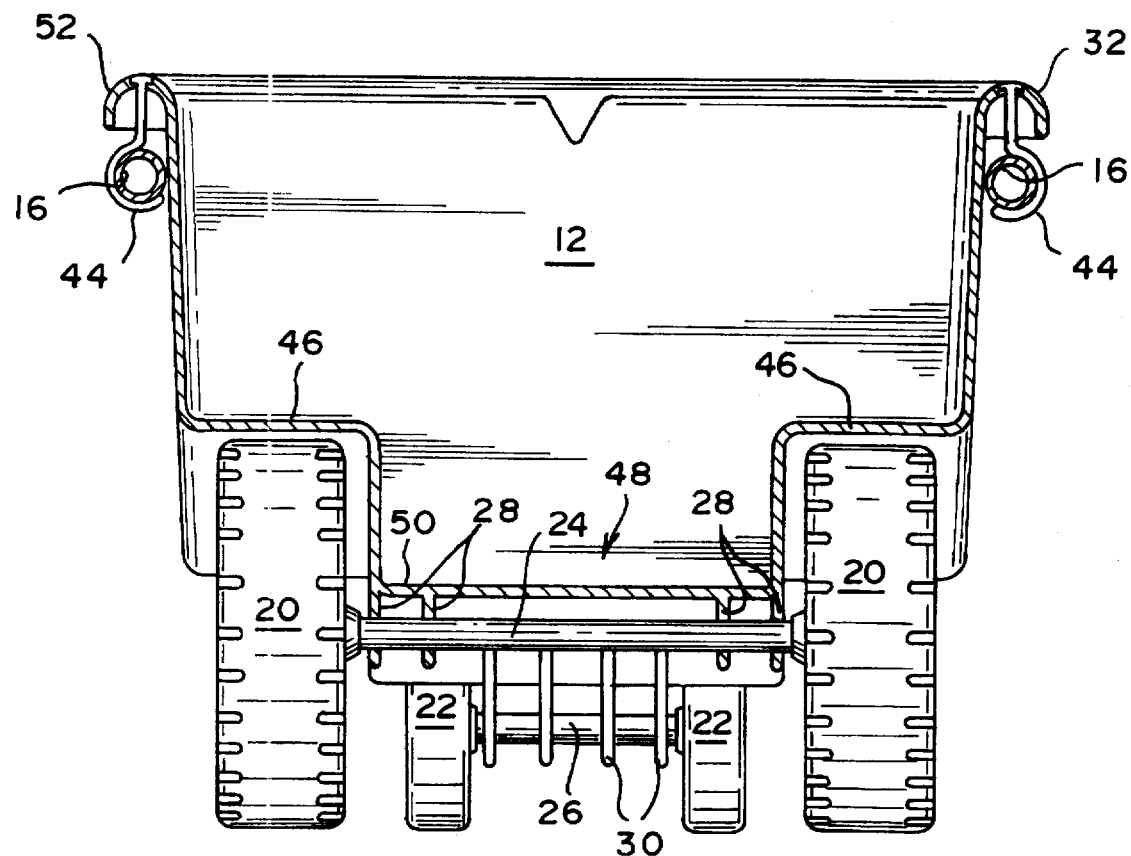
FIG_3
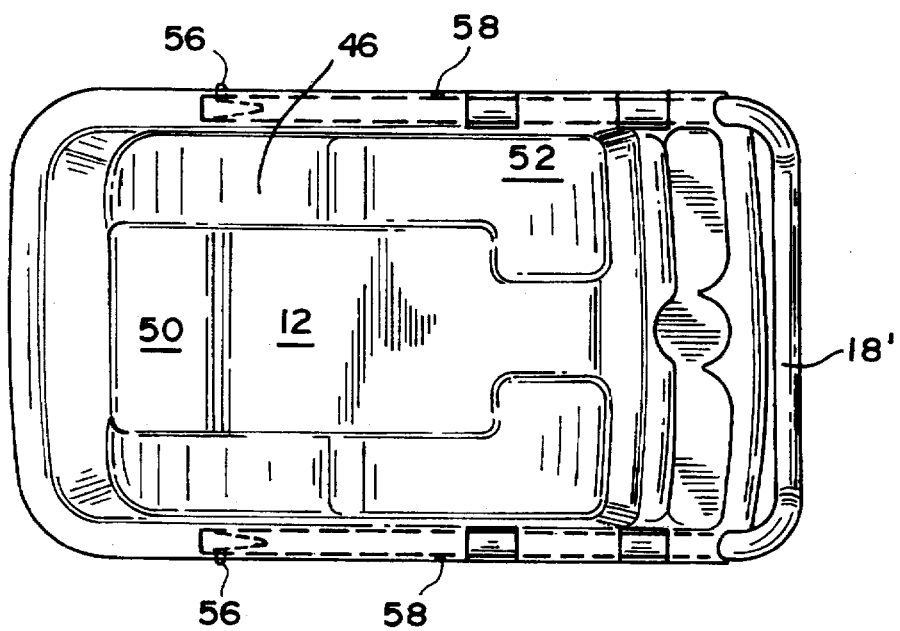
FIG_7

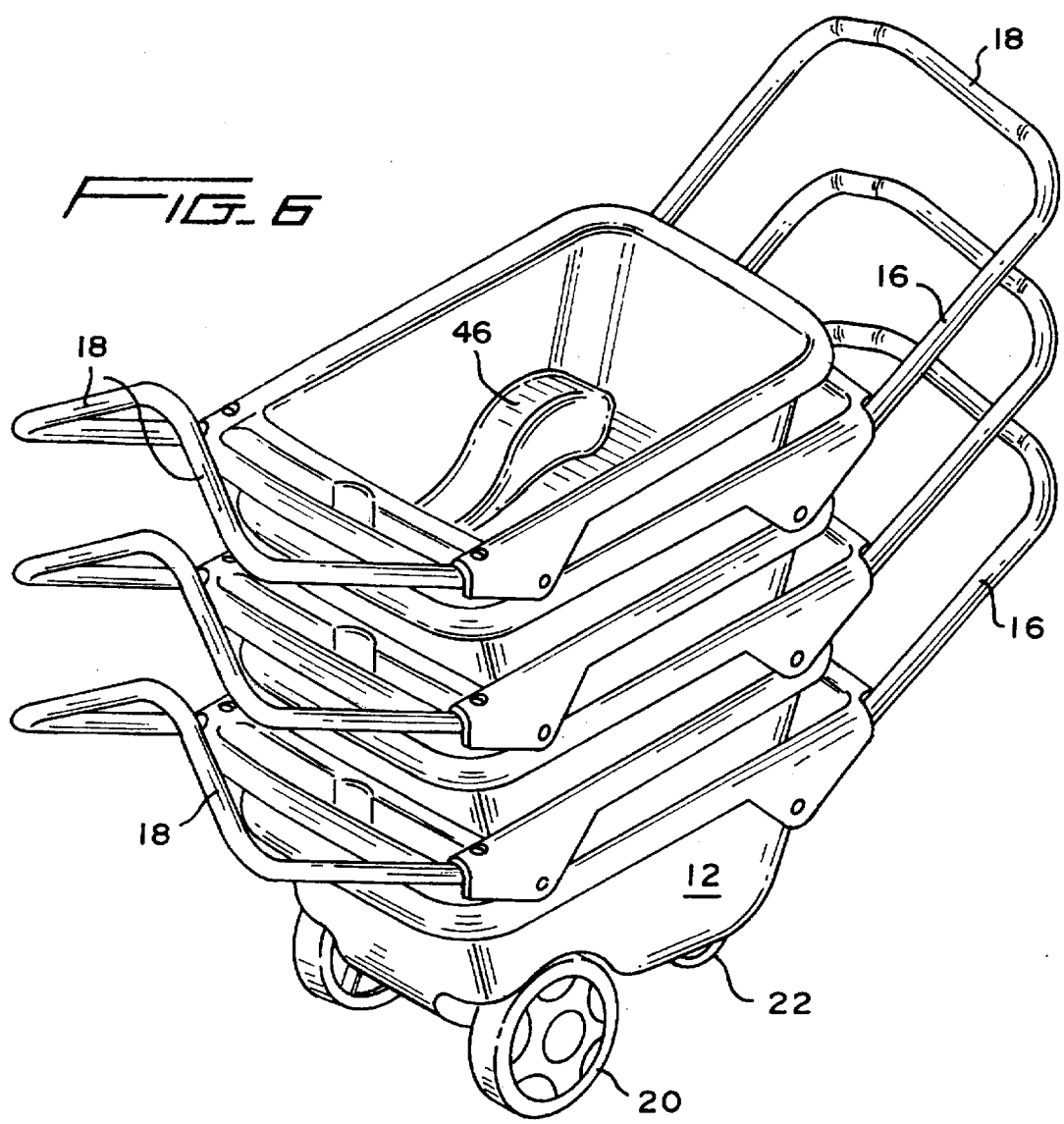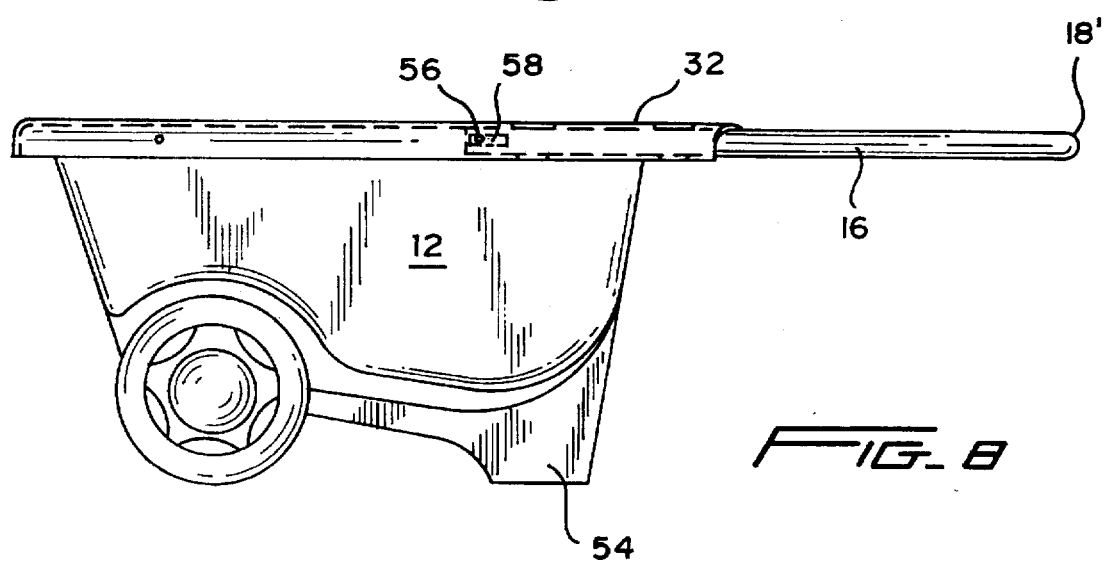

5,692,761

1

UTILITY CART

BACKGROUND OF THE INVENTION

The present invention relates to hand carts used for hauling debris materials—leaves, grass, logs, trash and the like—for and around the home, as well as building and construction materials, such as bricks, mortar and other bulky materials, including liquids.

Conventional utility carts used for the above mentioned purposes are usually cumbersome and unwieldy to handle, so that there is a need to provide a cart which is capacious enough to handle such bulky materials and at the same time combine sturdy support, high maneuverability and a design that can accommodate stacking for shipping and storage.

OBJECTS AND SUMMARY OF THE INVENTION

It is the primary purpose and main object of the present invention to address the aforementioned needs and desires and provide a utility cart that is capacious, sturdy and highly maneuverable.

It is still another object of the present invention to provide a utility cart that combines the stability of a four-wheel vehicle and the maneuverability of a two-wheel vehicle which can be lifted and pushed like a wheel barrow as well as pulled and pushed like a four-wheel vehicle.

It is yet another object of the present invention to provide a utility cart which offers a foldable or swingable handle that is efficient to use and ergonomic in design.

It is still another object of the invention to provide a utility cart which offers a handle that allows the user of the cart to grasp that part of the handle which most suits the user's height in order to efficiently maneuver the cart for lifting, lowering, pushing or pulling.

It is yet another object of the invention to provide a utility cart which is adapted for stacking or nesting in a highly efficient manner that allows for an increased stacking density suitable for shipping, storage and display that is not afforded by ordinary stacking methods.

It is still yet another object of the invention to provide a utility cart which can be stacked with a number of like carts with the handle for each cart either extended or collapsed.

It is yet another object of the invention to provide a utility cart that combines the above stacking features and uses only a two-wheel design in which the handle for each cart can be either slidably extended or collapsed.

According to one embodiment of the present invention there is provided a large bucket-like utility cart having four wheels, that is, two pairs of wheels arranged in a manner to allow easy maneuverability and tilting of the cart by means of a collapsible loop handle with an angled crossbar design in both forward and backward directions on respective pairs of wheels. Also, a number of such utility carts can be alternately stacked or nested within one another with either the handle extended for use or collapsed to its inoperative position, in either case making for a high-density multiple-product module suitable for shipping, storage or display from a point of sale.

The invention will be better understood and further objects and advantages thereof will become more apparent from the ensuing detailed description of the preferred embodiments taking in conjunction with the drawings.

BRIEF DESCRIPTION OF THE DRAWINGS

FIG. 1 is schematic perspective view of the utility cart according to the present invention;

FIG. 2 is a schematic side elevational view of the utility cart according to the invention;

FIG. 3 is a schematic end elevational view partly in cross-section of the utility cart according to the invention;

FIG. 6 is a schematic perspective of a stacked arrangement of a number of utility carts according to the invention with their handles extended in the operative position for display purposes;

FIG. 7 is schematic plan view of a utility cart according to the invention in which an alternative embodiment for the cart and handle is shown;

FIG. 8 is a schematic side elevational view of the embodiment shown in FIG. 7 with the handle in an extended operative position;

DETAILED DESCRIPTION

Figure 5:
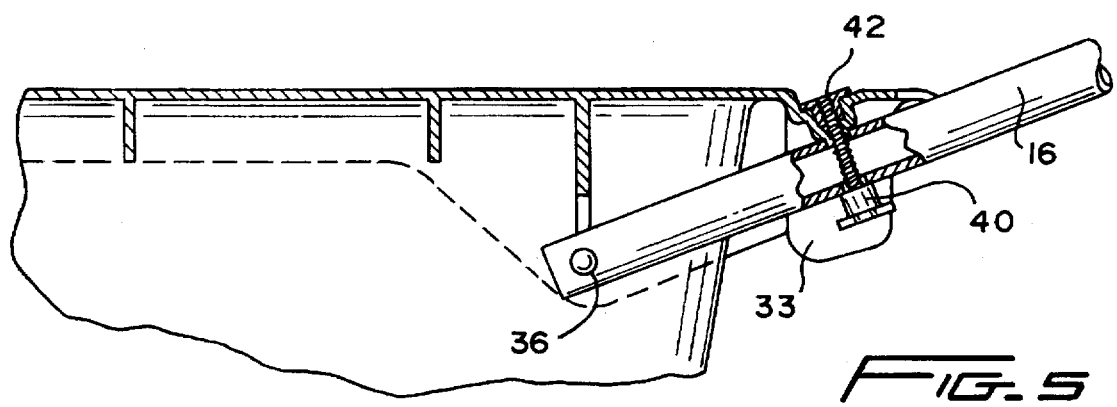
FIG. 5 is schematic cross-section showing a detail of the fastening device for the extended handle shown in FIG. 1.

Referring now to FIGS. 1–3 there is shown a utility cart 10 having an open ended receptacle 12 molded entirely from a plastic material. A loop-like handle 14, preferably formed from metal is also provided for use by an operator (shown in dotted lines in FIG. 1). The handle is seen to have a pair of leg members 16 and an angled crossbar 18 whose apex is disposed in a plane generally at right angles to the plane of the leg members 16, the purpose of which will be discussed below. The cart 10 is seen to have two pairs of wheels, preferably a large pair of wheels 20 at the front of the cart and a smaller pair of wheels 22 at the rear of the cart, as best shown in FIGS. 2 and 3. An axle 24 connecting the large pair of wheels 20 is seen to be greater in length than the axle 26 connecting the smaller wheels 22. The respective axles 24, 26 themselves are supported respectively by suitably apertured lug members 28 and 30 depending from the receptacle 12 which are formed by conventional molding techniques. The cart is also shown to have molded integrally therewith a rim portion 32 having a pair of depending ear members 34, only one of which is shown in the drawings. The rim 32 also surrounds a tool-carrying basket portion 33 at the rear of the receptacle 12 that includes a circular profile portion 35 in the center thereof for holding a beverage can. As shown in FIG. 2, the leg members 16 of the loop-like handle 14 are pivoted between the sidewalls of the receptacle 12 and the depending ear members 34 by suitable fasteners 36. The rim 32 is seen to have a pair of cut-out portions or apertures 38 through which extend the leg members 16 of the handle 14, shown In FIG. 1 and in phantom in FIG. 2. As best shown in FIG. 5, the leg members 16 of the handle 14 are seen to carry thumb-screw fasteners 40 apertured therethrough which cooperate with suitable nut-like members 42 disposed in suitable recesses in the rim portion 32 of the receptacle 12.

Figure 4:
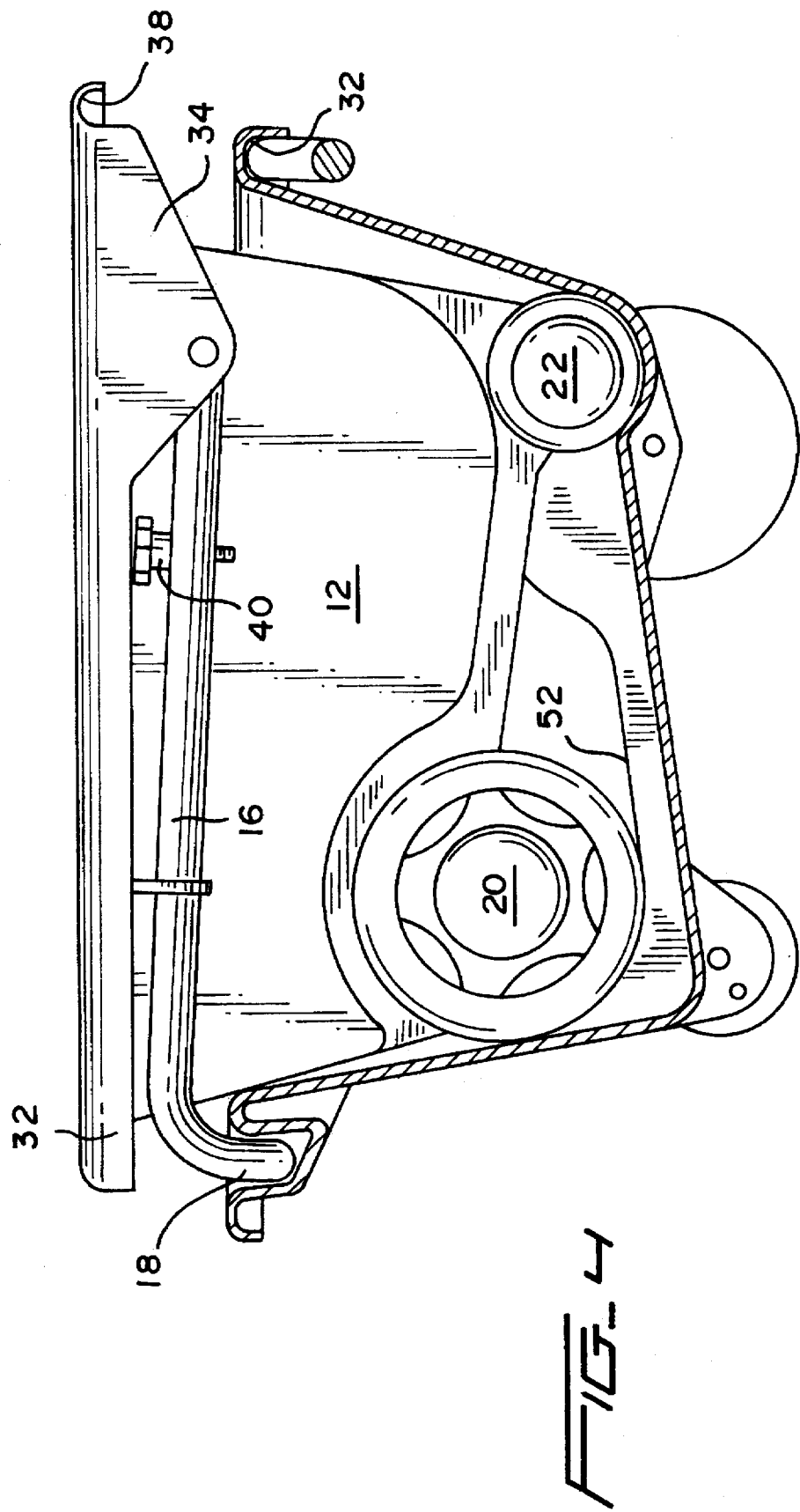
FIG. 4 is schematic side elevational view partly in cross-section of a stacked arrangement of two utility carts with a handle shown in the folded inoperative position.
Figure 9:
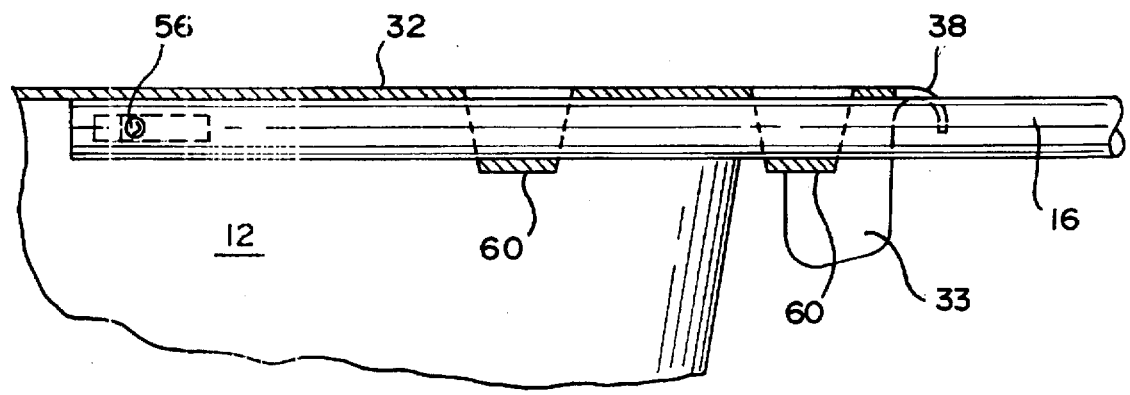
FIG. 9 is a schematic cross-section showing a detail of the alternative embodiment of the handle shown in FIGS. 7 and 8.

In FIGS. 2–4 the loop-like handle 14 is shown swung across the bottom of the receptacle 12 about the pivot pins 36 to its inoperative position. Pliable or plastic hook members 44 are shown in FIGS. 2 and 3 depending from the underside of the rim 32 and molded integrally therewith (see FIG. 3) for securing or fastening the leg members 16 in their inoperative position.

As best shown in FIG. 3, one end of the bottom of the receptacle 12 is formed with a pair of fender portions 46 that override the wheels 20 and that form therebetween a well portion 48 in the bottom of the receptacle 12 having respective depressions 50, as best shown in FIG. 4, that complement the curvature of the smaller wheels 22. At the other end of the bottom portion of the receptacle 12 there are provided raised panel portions 52 whose curvature matches that of the larger wheels 20. As best shown in FIG. 4 and in accordance with the principles of the invention, the structure of the bottom portion of the receptacle 12 allows a number of utility carts to be stacked alternatively with respect to one another, so that the wheels 22 of one cart fit into the well 48 of an underlying cart and ride in the curved depressions 50, whereas the larger wheels 20 sit in the complementary curvatures of the panels 52.

FIG. 6 shows a stacked arrangement of the carts according to the invention but with their handles in the extended operative position, unlike the stacked arrangement shown in FIG. 4. It should be understood that according to the principles of the invention the utility carts can be stacked alternatively regardless of whether their handles are extended or folded. Also, because of this particular stacking feature, a greater multiple-product density can be achieved either for shipping or for display than normally would be available with a stacking arrangement in which the carts are stacked in unison. While the carts are shown in their right-side up positions, which would be the case for display purposes, it should be understood that the carts can be stacked in an upside down manner for shipping purposes, as shown for the alternatively embodied cart in FIG. 11, which will be discussed below.

Referring again to FIG. 1, it will be seen that a user of the handle 14 will normally grasp the angled crossbar 18 to either push down on the handle and thereby tilt the cart about the axis of the smaller wheels 22, or the user may lift the handle, preferably by means of the leg members 16 for greater leverage, to thereby pivot the cart about the axis of the larger wheels 20. Of course, the cart may be pushed or pulled on all four wheels by means of the crossbar 18. The angle in the crossbar 18 allows the operator to grasp the crossbar at different locations on the vertical in order to best suit the user's own height and to find as well the maximum point of control when steering the cart. In this way the angled handle portion 18 operates much like the steering wheel in a car.

In FIGS. 7 and 8 there is shown an alternative embodiment for the loop-like handle feature as well as the wheel arrangement for the utility cart according to the invention. In this case only the front wheels are required, the back wheels having been replaced by leg members 54 which act as rests for the cart when it is lowered or pivoted about the front wheels in a downward direction in the same manner as a conventional wheelbarrow, as best shown in FIG. 8. Each of the leg members 54 is of the same width as each of the rear wheels 22 in the first embodiment of the invention. Also in this alternative embodiment the handle 14 collapses or slides under the rim portion of the receptacle 12 into its inoperative position. For this purpose each of the leg members 16 of the handle is provided with a floating spring tab 56 at their extremities that extends into a respective hole 58 provided in the rim portion 32 overlying the leg members when the handle is fully extended. For supporting the leg members 16 of the handle in the extended position, the rim portion 32 is provided with two lower sections 60 on each side of the receptacle 12 that are molded in place by means of a bypass shutoff method during the molding operation, this operation forming no part of the present invention. These sections 60 together with the underside of the rim member 32 provide a set of apertures through which slide the respective leg members 16 of the handle 14.

In the embodiment according to FIGS. 7 and 8 the angled crossbar of the loop-like handle is dispensed with and instead a straight crossbar 18' is used since the user would not be pushing on the handle in a downward direction as he would when using the cart according to the first embodiment already described. The loop-like handle 14 according to the embodiment shown in FIGS. 7 and 8 can be either pulled out from the receptacle to its extended position which is defined by where the spring-biased tab members 56 press into their respective holes 58 in the side of the rim portion 32, or the handle can be telescoped back into the receptacle, sliding through the respective apertures created by the sections 60 and the underside of the rim portion 32. When the handle 14 is extended, as shown in FIG. 8, it is effectively supported by the two spaced-apart lower sections 60 opposite the underside of the rim 32, which then allows the cart to be lifted or lowered by the extended handle.

Figure 10:
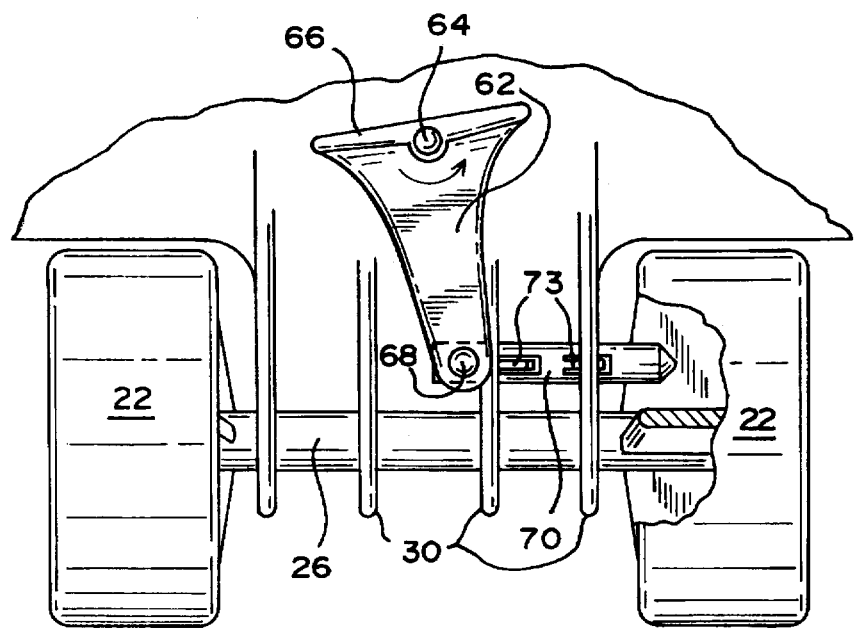
FIG. 10 is schematic detail view of the brake device used with the utility cart according to the invention.

As shown in FIG. 10, a manual brake is provided for the embodiment of the cart shown in FIG. 1. Thus, one of the smaller wheels 22 can be braked when the cart is at rest on all four wheels. For this purpose a foot-operated lever 62 has one end pivoted to the rear wall of the receptacle 12 by means of a suitable fastener 64. The lever 62 has an extended pedal surface 66 that allows the lever to be rotated one way or the other depending on which side of the pedal is pushed to make the lever rotate. The other end of the lever 62 is pivoted by a suitable fastener 68 to one end of a slide member 70 that extends through suitable apertures in the depending bracket members 30. The free end of the slide 70 is seen to penetrate one of the spaces between the conventional spokes of one of the wheels 22, thereby preventing the wheel from turning. If the foot pedal is pressed to pivot about its pivot fastener 64 to thereby rotate in an opposite direction to that shown by the arrow, the lever 62 will shift in a direction to pull the slide 70 away from the space between the spokes of the wheel, thus freeing the braking action. The slide member 70 is held at its extreme positions by means of two integrally molded detent members 73 which engage in a spring-biased manner the apertures in the depending bracket members 30.

Figure 11:
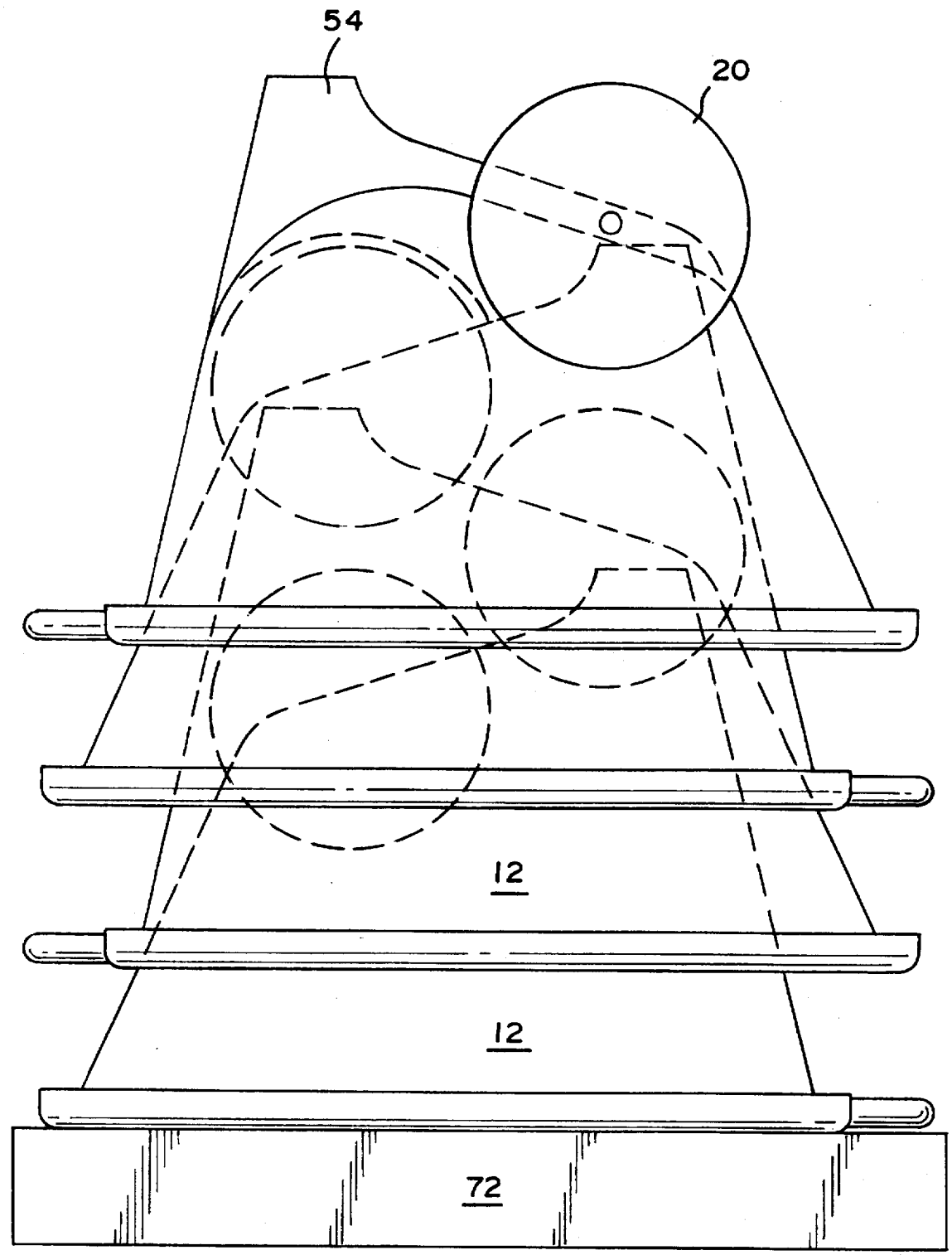
FIG. 11 is schematic side elevational view of a stacked arrangement of carts according to the embodiment shown in FIGS. 7 and 8.

In FIG. 11 is shown a stacking arrangement for the alternate embodiment of the cart shown in FIGS. 7 and 8. The stacking arrangement is the same in principle as for the first embodiment of the cart shown in FIG. 6; that is, the carts 12 are alternately arranged one on top of the other. In this instance, however, the carts are shown turned upside down and resting on a pallet 72 for shipping purposes. Of course, the carts could be stacked right side up with their handles extended for display purposes, as shown in the embodiment of FIG. 6.

While it is preferable that the one pair of wheels 20 be larger than the other pair of wheels 22 used with the cart according to the invention, it is possible that both pair of wheels could be of a similar size and still have the cart operate as above described. Nor would similarly sized wheels interfere with the alternative arrangement for stacking as above described, either with the handle extended for use or folded or collapsed for non-use.

The foregoing relates to preferred exemplary embodiments of the present invention, it being understood that other embodiments and variants thereof are possible within the scope of the invention, the latter being defined by the appended claims.

What is claimed and desired to be secured by Letters Patent of the United States is:

1. A utility hand cart comprising
    an open-ended receptacle having a pair of oppositely disposed fender portions in a bottom wall of said receptacle,
    a handle for said cart,
    a first and second pair of wheels spaced from one another and disposed at the bottom of said receptacle, said first pair of wheels being disposed under said pair of fender portions in said bottom wall of said receptacle,
    the wheels of said first pair of wheels being displaced from each other a greater distance than the wheels of said second pair of wheels are displaced from each other, and
    said fender portions being spaced apart a distance sufficient enough for said second pair of wheels to fit between said fender portions at the bottom of said receptacle, whereby said cart can be nested in a reverse manner with respect to and within the receptacle of a similar and underlying cart for purposes of stacking a number of like carts alternately one with respect to another.

2. A utility cart according to claim 1, wherein a portion of said bottom of said receptacle between said fender portions is curved to complement the curvature of said second pair of wheels.

3. A utility hand cart according to claim 1, wherein said handle is a loop-like handle and said cart further comprises pivotal means for pivotally connecting said loop-like handle to said receptacle for allowing said handle to swing across the bottom of said cart from an extended operative position into an inoperative folded position, whereby said utility cart can be nested with said number of like carts when said loop-like handle is either in said folded inoperative position or in said extended operative position.

4. A utility hand cart comprising
    an open-ended receptacle,
    a first and second pair of wheels spaced from one another and disposed at the bottom of said receptacle,
    a loop-like handle for said cart having spaced apart leg members connected to said receptacle and a crossbar connecting said leg members,
    said crossbar angled to form an apex in said crossbar in a generally vertical plane for accommodating a user's hands at different heights on said crossbar, whereby said utility hand cart is pivotable about the axis of said first pair of wheels by lifting said loop-like handle and is pivotable about the axis of said second pair of wheels by pushing downward on said crossbar of said loop-like handle,
    rim means extending around at least a major portion of the perimeter of said open-ended receptacle, and
    pivot means connecting said loop-like handle to said receptacle for allowing said loop-like handle to be swung across the bottom of said receptacle from an operative position to an inoperative position.

5. A utility hand cart according to claim 4, wherein said rim means comprises a pair of depending ear members for respectively supporting said pivot means for said handle.

6. A utility hand cart according to claim 4 further comprising a first fastening means for securing said leg members of said loop-like handle to respective portions of said rim means when said loop-like handle is extended into said operative position, and a second fastening means for securing said leg members in said inoperative position.

7. A utility hand cart comprising
    an open-ended receptacle,
    a first and second pair of wheels spaced from one another and disposed at the bottom of said receptacle,
    a loop-like handle for said cart having spaced apart leg members connected to said receptacle and a crossbar connecting said leg members,
    said crossbar angled to form an apex in said crossbar in a generally vertical plane for accommodating a user's hands at different heights on said crossbar, whereby said utility hand cart is pivotable about the axis of said first pair of wheels by lifting said loop-like handle and is pivotable about the axis of said second pair of wheels by pushing downward on said crossbar of said loop-like handle, and
    a foot-operated brake means for said second pair of wheels.

8. A utility hand cart comprising,
    an open-ended receptacle having a pair of oppositely disposed fender portions in a bottom wall of said receptacle,
    a handle for said cart,
    a pair of wheels disposed at the bottom of said receptacle under said pair of fender portions in said bottom wall of said receptacle,
    a pair of leg members spaced from said pair of wheels disposed at the bottom of said receptacle for supporting said receptacle in a rest position,
    the wheels of said pair of wheels being displaced from each other a greater distance than the leg members of said pair of leg members are displaced from each other, and
    said fender portions being spaced apart a distance sufficient enough for said pair leg members to fit between said fender portions at the bottom of said receptacle, whereby said cart can be nested in a reverse manner with respect to and within the receptacle of a similar underlying cart for purposes of stacking a number of like carts alternately one with respect to another.

9. A utility hand cart according to claim 8, further comprising rim means extending around at least a major portion of the perimeter of said open-ended receptacle.

10. A utility hand cart according to claim 9, wherein said handle means is a loop-like handle, and said rim means includes an aperture means adjacent respective sidewalls of said receptacle for supporting said loop-like handle to slidingly extend along the underside of said rim means of said receptacle in one direction to an inoperative position and in an opposite direction to an extended operative position.

11. A utility hand cart according to claim 8, wherein said handle is a loop-like handle and said cart further comprises aperture means for supporting said loop-like handle to slidingly extend along the sidewalls of said receptacle in one direction to a collapsed inoperative position and in an opposite direction to an extended operative position, whereby said utility cart can be nested with said number of like carts when said loop-like handle is either in said collapsed inoperative position or in said extended operative position.

* * * * *